April 8, 1924.

J. W. BRUNDAGE

AIR BAG BUFFING MACHINE

Filed Oct. 4, 1922      3 Sheets-Sheet 1

1,489,922

Inventor:

James W. Brundage,

Attorneys.

April 8, 1924.
J. W. BRUNDAGE
1,489,922
AIR BAG BUFFING MACHINE
Filed Oct. 4, 1922        3 Sheets-Sheet 3
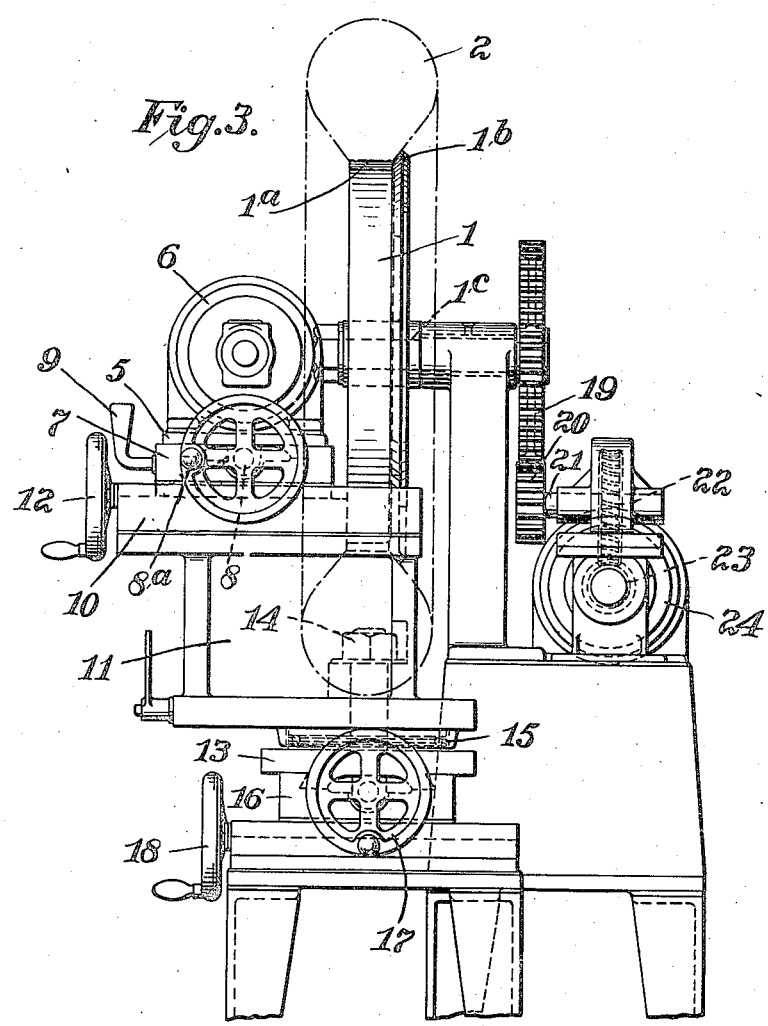
Fig. 3.
Fig. 4.
Inventor:
James W. Brundage,
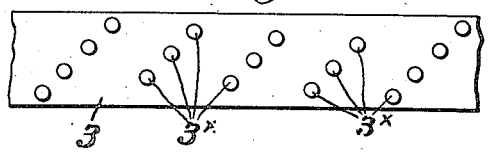
Attorneys Patented Apr. 8, 1924.

1,489,922

UNITED STATES PATENT OFFICE.

JAMES W. BRUNDAGE, OF AKRON, OHIO, ASSIGNOR TO THE MILLER RUBBER COMPANY, OF AKRON, OHIO, A COMPANY OF OHIO.

AIR-BAG-BUFFING MACHINE.

Application filed October 4, 1922. Serial No. 592,277.

*To all whom it may concern:*

Be it known that I, JAMES W. BRUNDAGE, a citizen of the United States, and resident of Akron, in the county of Summit, in the State of Ohio, have invented certain new and useful Improvements in Air-Bag-Buffing Machines, of which the following is a specification.

My present invention relates to an improved machine or apparatus designed for renewing worn air bags such as are used in the manufacture of pneumatic tires.

The air bags which are now generally used are made of vulcanized rubber compound reinforced by fabric at the part adjacent the beads, the part adjacent the side walls and tread portion being wholly of rubber. After a certain amount of use in which the bags are subjected to expansion and exposure to vulcanizing temperatures, the outer surface of the bag becomes overcured, hard and brittle, whereafter the expansion and folding to which the bag is subjected in placing it in removal from the tires, causes it to crack.

The present invention aims to provide a machine or apparatus by which the life of the bag may be renewed prior to such cracking, thereby lengthening the life of the bag, and to do this economically and expeditiously.

Specifically the machine is designed to remove the outer surface of the bag which had become over-cured and thus hard and brittle, by an abrasive or buffing action, and thereafter apply to said surface a coating of rubber cement over which is applied a new outside layer of rubber, after which the bag is re-vulcanized.

A machine or apparatus embodying my invention is shown in the accompanying drawings, in which:—

Fig. 3 is an end view.

Figs. 4, 5 and 6 are details of the buffing wheel.

Figure 1:
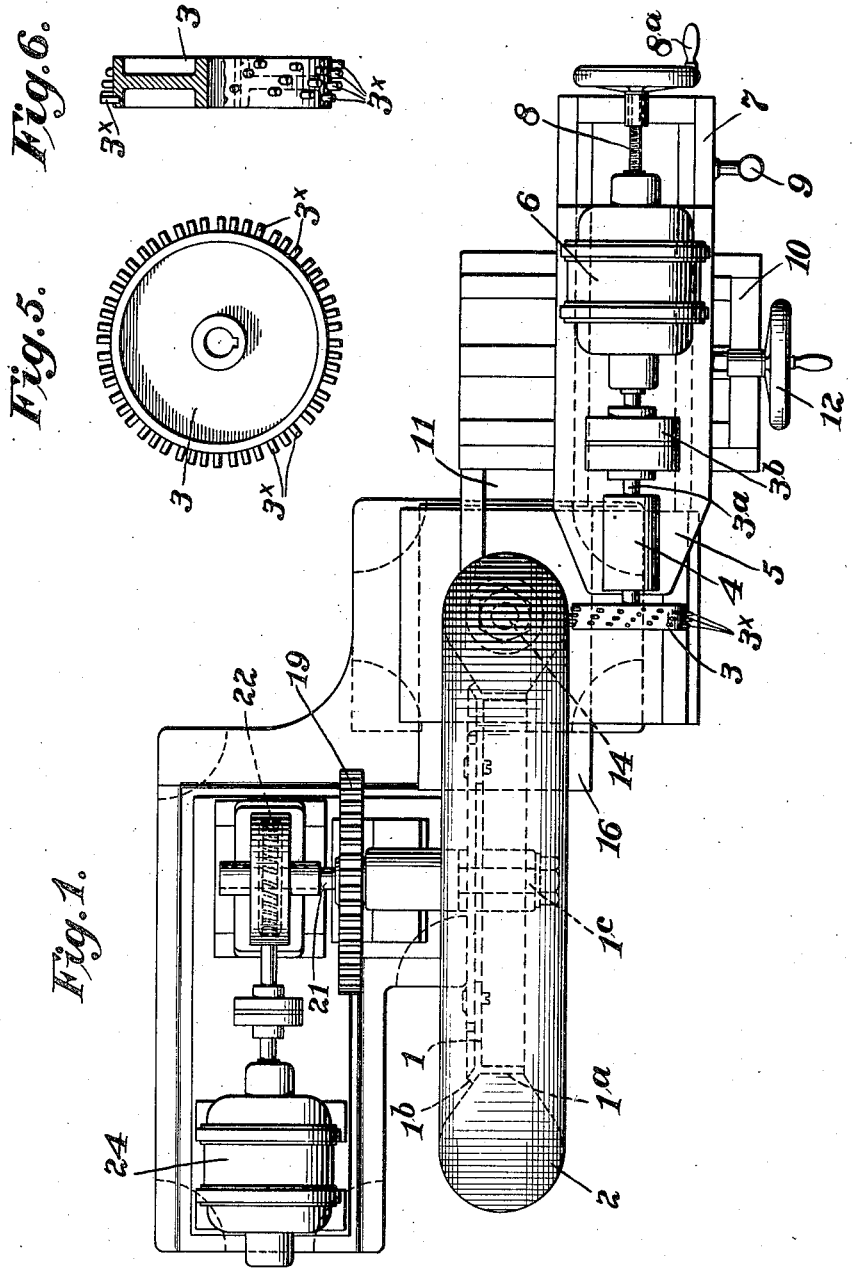
Figure 1 is a plan view of the apparatus.
Figure 2:
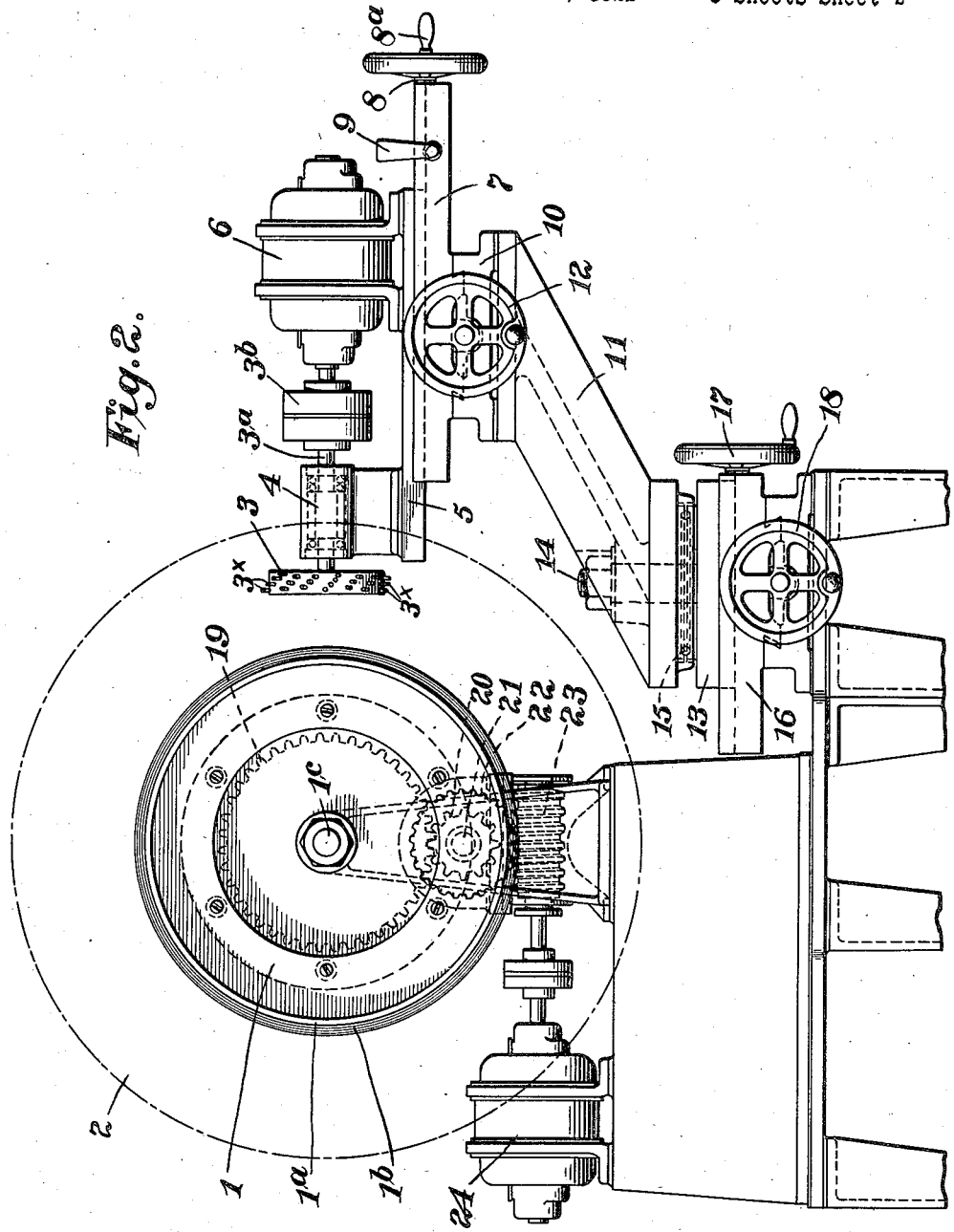
Fig. 2 is a side elevation.

Referring by reference characters to these drawings, the numeral 1 designates a suitable chuck or carrier having a peripheral surface 1ª designed to carry the air bag, and a retaining flange 1ᵇ against which the bag abuts at one side, the air bag 2, being shown in position to be buffed. The numeral 3 designates a buffing wheel mounted on a shaft 3ª journaled in suitable bearings 4, carried by a slide 5 and driven by an electric motor 6, the shaft 3ª being coupled to the motor shaft by the customary coupling, shown conveniently at 3ᵇ. The slide 5 is mounted to move in a rectilinear path in a suitable guideway in a slide carrier 7, the slide being adapted to have movement imparted thereto by the screw shaft 8, capable of being rotated by the handle 8ª, the carrier being provided with a suitable operating handle 9. Slide carrier 7 is mounted to move in a transverse rectilinear path on a guide member 10 carried at the upper end of an inclined arm or bracket member 11, supported in the manner hereinafter described. Slide carrier 7 is adapted to be moved in its rectilinear path by means of a screw and handle member or hand wheel 12. Arm or bracket member 11 has its lower end articulated to a supporting member 13 preferably by means of a pivot bolt 14 and interposed anti-friction bearings indicated at 15. The member 13 is in the form of a slide mounted to move in a rectilinear path in a suitable guide-way of a carrier member 16, which in turn is mounted to move in a rectilinear path at right angles to the first named path, the respective parts 13 and 16 being capable of adjustment along their respective guideways by screws operated by hand wheels indicated at 17 and 18 respectively.

The chuck or air bag carrier is mounted on a shaft 1ᶜ and is designed to be driven by suitable means such for example as intermeshing gears 19 and 20, the latter being fast on a shaft 21 carrying a worm wheel 22 driven by a worm 23 operated by an electric motor 24.

In the operation of the device, the members 13 and 16 are adjusted until the axis upon which the arm or member 11 is articulated is directly in line with the center of the portion of the air bag which is intersected by a horizontal plane passing through the axis 1ᶜ about which the chuck rotates, this adjustment being rendered necessary by variations in the sizes of the air bags.

The adjustment above referred to having been made, the members 5 and 7 are then adjusted until the buffing wheel 3 contacts with the peripheral surface of the air bag. Motor 24 is then started to set shaft 1ᶜ in motion and thus revolve the chuck and air bag, and at the same time motor 6 is started to drive the buffing wheel. Thereafter by grasping the handle 9 the operator swings the arm 11 around, which causes the buffing wheel to travel from one side of the air bag around the tread portion to the other side, the buffing wheel moving in a path concentric with the surface of the air bag and remaining in buffing or abrading contact therewith.

It will be understood that these air bags are sufficiently stiff to retain their position upon the mandrel or chuck without necessity of inflation.

The form of buffing wheel which I have found most satisfactory, comprises a circular disc of soft steel 3 having its peripheral face drilled radially to receive pins $3^x$ of hardened steel. The pins are arranged in diagonal rows, and the pins in successive rows are staggered or arranged helically so as to be out of line, and their outer ends are all ground to uniform height.

Having thus described my invention, what I claim is:—

1. Apparatus for the purpose described, comprising a rotary support for an air bag, an arm pivoted on a supporting member and having its pivotal axis passing through the center of the portion of the air bag which is intersected by a plane which passes through the axis of the rotary support perpendicular to the axis of said arm, and a rotary buffing wheel supported by said arm.

2. Apparatus for the purpose described, comprising a support for an air bag journaled to rotate about a horizontal axis, an arm having an offset upper portion, a support upon which said arm is pivoted to swing about a vertical axis, means for imparting rectilinear movement to said support, a buffing wheel carrier mounted at the upper end of said arm, means for imparting rectilinear movement to said buffing wheel carrier, and a buffing wheel rotatably mounted on said carrier with means for operating it.

3. In combination, a rotary chuck for an air bag, a horizontally adjustable member, an arm having one end pivoted to said member on an axis perpendicular to the axis of said chuck, anti-friction bearings for said arm, said arm having an offset portion, a carrier adjustably carried by the offset portion of said arm, and a buffing wheel supported by said carrier with means for operating it.

4. In combination, a rotary chuck for an air bag, an arm, a supporting member on which one end of said arm is pivoted to enable the arm to swing about an axis perpendicular to the axis of the chuck, means for imparting rectilinear movement to said support in a plane parallel to the axis of the chuck, said arm having its other end offset from its pivot, a buffing wheel supported by said arm with means for operating it, and means for adjusting said buffing wheel on said pivoted arm.

5. In combination, a rotary chuck for an air bag journaled upon a horizontal shaft, a slide member with means for imparting rectilinear movement thereto in a horizontal plane, said arm having an offset end, a slide member carried by said offset end with means for imparting movement thereto in a horizontal plane, a buffing wheel supported by said last named slide member, and means for moving said slide member.

6. In combination, a base, a chuck supported thereon to rotate about a horizontal axis, a slide member carried by said base, a second slide member carried by said first named slide member, an arm having one end pivotally supported from said second slide member so as to enable the arm to swing about a vertical axis, a third slide member supported by the free end of said arm, and a buffing wheel carried by said third slide member.

In testimony whereof, I affix my signature.

JAMES W. BRUNDAGE